United States Patent
Oda

(10) Patent No.: US 11,358,234 B2
(45) Date of Patent: Jun. 14, 2022

(54) NOZZLE DISTANCE CONFIRMING DEVICE AND METHOD OF NOZZLE DISTANCE CONFIRMATION

(71) Applicant: HONDA MOTOR CO., LTD., Tokyo (JP)

(72) Inventor: Koji Oda, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 337 days.

(21) Appl. No.: 16/744,340

(22) Filed: Jan. 16, 2020

(65) Prior Publication Data

US 2020/0238416 A1    Jul. 30, 2020

(30) Foreign Application Priority Data

Jan. 25, 2019   (JP) .............................. JP2019-010773

(51) Int. Cl.
*G01B 5/14* (2006.01)
*B23K 5/22* (2006.01)

(52) U.S. Cl.
CPC . *B23K 5/22* (2013.01); *G01B 5/14* (2013.01)

(58) Field of Classification Search
CPC .. B23K 5/22; G01B 5/14; G01B 7/023; B05C 11/1018; B05C 5/02; B25J 9/0081; B25J 9/1602; B25J 9/1679; B25J 11/0075
See application file for complete search history.

(56) References Cited

U.S. PATENT DOCUMENTS

| | | | |
|---|---|---|---|
| 9,109,986 B2 * | 8/2015 | Nishiyama | H05K 13/082 |
| 11,014,198 B2 * | 5/2021 | Izumi | B23K 26/38 |
| 2017/0082416 A1 * | 3/2017 | Besuchet | G01B 11/005 |
| 2018/0229377 A1 * | 8/2018 | Okuda | B25J 13/08 |
| 2020/0238326 A1 * | 7/2020 | Oda | B05B 15/50 |
| 2020/0238416 A1 * | 7/2020 | Oda | G01B 5/14 |

FOREIGN PATENT DOCUMENTS

| | | | | |
|---|---|---|---|---|
| CN | 206966010 | | 2/2018 | |
| JP | 07-003866 | | 1/1995 | |
| JP | 2020116697 | A * | 8/2020 | ......... B05C 11/1018 |
| KR | 20130070384 | | 6/2013 | |

OTHER PUBLICATIONS

Chinese Office Action and Search Report for Chinese Patent Application No. 202010065972.4 dated Feb. 19, 2021.

* cited by examiner

*Primary Examiner* — Yaritza Guadalupe-McCall
(74) *Attorney, Agent, or Firm* — Amin, Turocy & Watson, LLP

(57) ABSTRACT

In a nozzle distance confirming device and a method of nozzle distance confirmation, first, a nozzle distance confirming member together with an exchange section is attached to a tip section of a nozzle main body. Next, a tip section of a needle is caused to abut on the nozzle distance confirming member, whereby the nozzle distance confirming member is exposed from the exchange section and brought into contact with a workpiece. Next, a position of the needle is detected by an eddy current sensor.

6 Claims, 4 Drawing Sheets

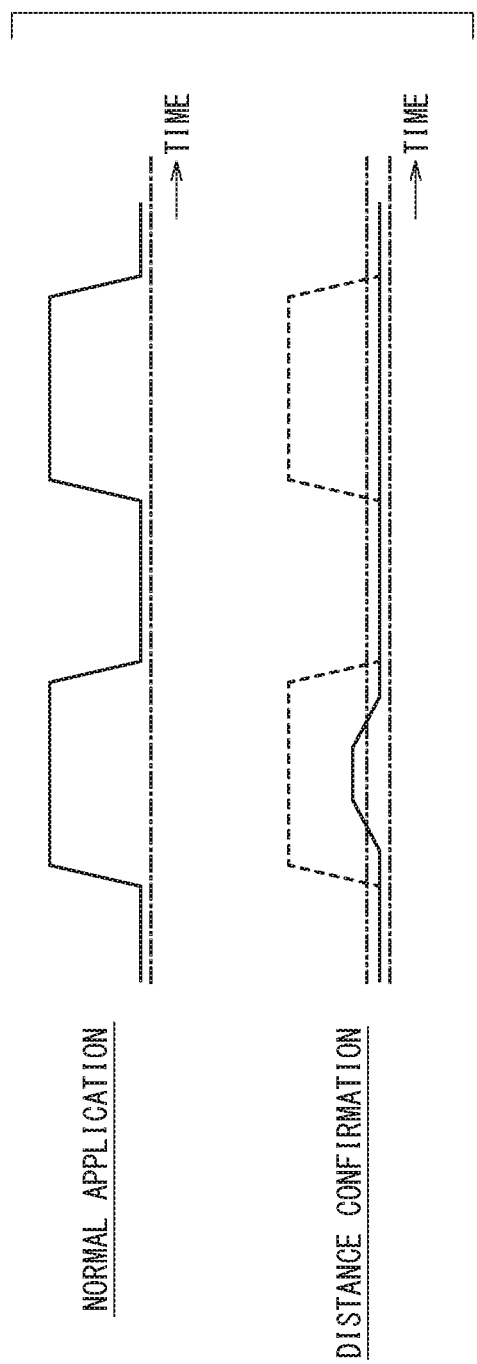

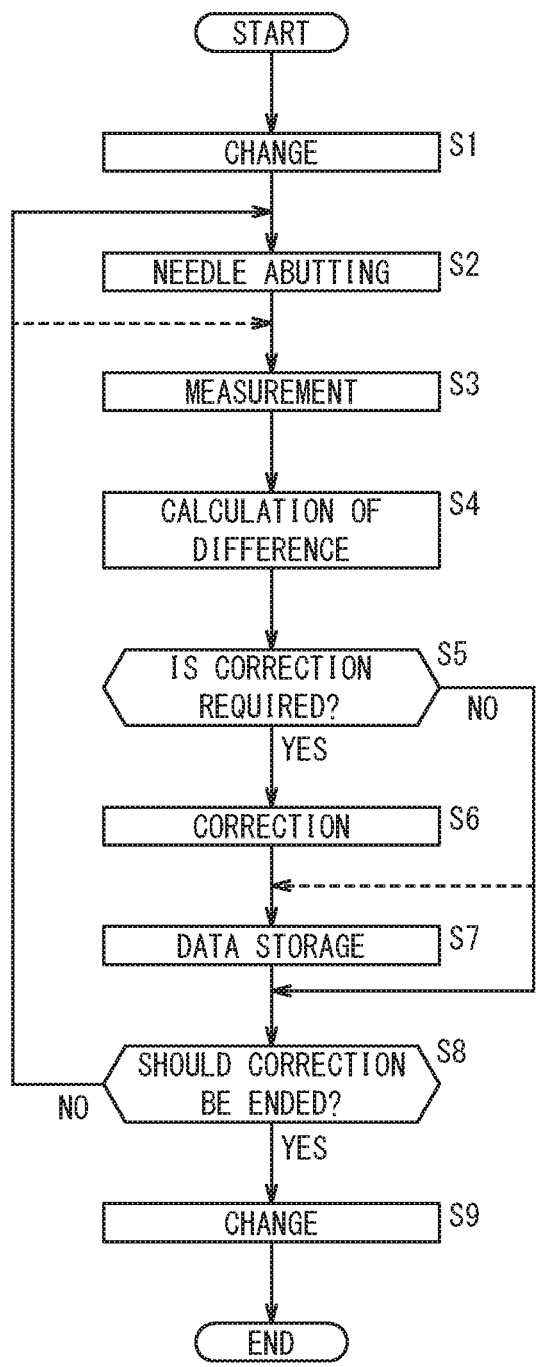

NOZZLE DISTANCE CONFIRMING DEVICE AND METHOD OF NOZZLE DISTANCE CONFIRMATION

CROSS-REFERENCE TO RELATED APPLICATION

This application is based upon and claims the benefit of priority from Japanese Patent Application No. 2019-010773 filed on Jan. 25, 2019, the contents of which are incorporated herein by reference.

BACKGROUND OF THE INVENTION

Field of the Invention

The present invention relates to a nozzle distance confirming device and a method of nozzle distance confirmation for confirming a distance between a nozzle and a workpiece.

Description of the Related Art

In Japanese Laid-Open Utility Model Publication No. 07-003866, for example, it is disclosed that a teaching jig instead of a welding tip is attached to a tip of a welding torch mounted on an arm of a robot, and teaching is performed in a state where the teaching jig has been attached.

SUMMARY OF THE INVENTION

However, in the technology of Japanese Laid-Open Utility Model Publication No. 07-003866, it is not possible in the case of there being an error between a position of the welding torch indicated by teaching data and a suitable position of the welding torch when welding work is actually performed on the workpiece, for a correction amount with respect to the error to be grasped in advance.

The present invention was made considering such a problem, and has an object of providing a nozzle distance confirming device and a method of nozzle distance confirmation by which an error of teaching data can be easily and efficiently confirmed.

Aspects of the present invention relate to a nozzle distance confirming device and a method of nozzle distance confirmation for confirming a distance between a nozzle and a workpiece.

The nozzle distance confirming device includes: a needle configured to open and close an opening section of a tip of the nozzle; a needle advancing and retracting unit configured to advance and retract the needle with respect to the opening section; a needle position detecting unit configured to detect a position of the needle; and a nozzle distance confirming member provided in an attachable manner to the tip of the nozzle, configured to abut on a tip of the needle, and configured to, when confirming the distance between the nozzle and the workpiece, contact the workpiece by being exposed from the tip of the nozzle in a state of having abutted on the tip of the needle.

Moreover, the method of nozzle distance confirmation includes the steps of: attaching a nozzle distance confirming member to a tip of the nozzle; causing a tip of a needle to abut on the nozzle distance confirming member by a needle advancing and retracting unit, and thereby exposing the nozzle distance confirming member from the tip of the nozzle to bring the nozzle distance confirming member into contact with the workpiece; and detecting a position of the needle by a needle position detecting unit.

Due to the present invention, when confirming the distance between the nozzle and the workpiece, the needle advancing and retracting unit advances and retracts the needle according to teaching data and causes the tip of the needle abut on the nozzle distance confirming member, whereby the position of the needle when the nozzle distance confirming member has contacted the workpiece can be detected. In this case, if there is a difference between the position of the needle expected from the teaching data and the position of the needle actually detected, then it can be grasped in advance that there is an error between the position of the nozzle indicated by the teaching data and the actual position of the nozzle with respect to the workpiece. Hence, in the present embodiment, an error of teaching data can be easily and efficiently confirmed.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 3 is a timing chart showing a change in position of a needle during normal operation and during nozzle distance confirmation; and FIG. 4 is a flowchart showing operation of the nozzle distance confirming device of FIG. 1 (a method of nozzle distance confirmation).

DESCRIPTION OF THE PREFERRED EMBODIMENTS

Figure 1:
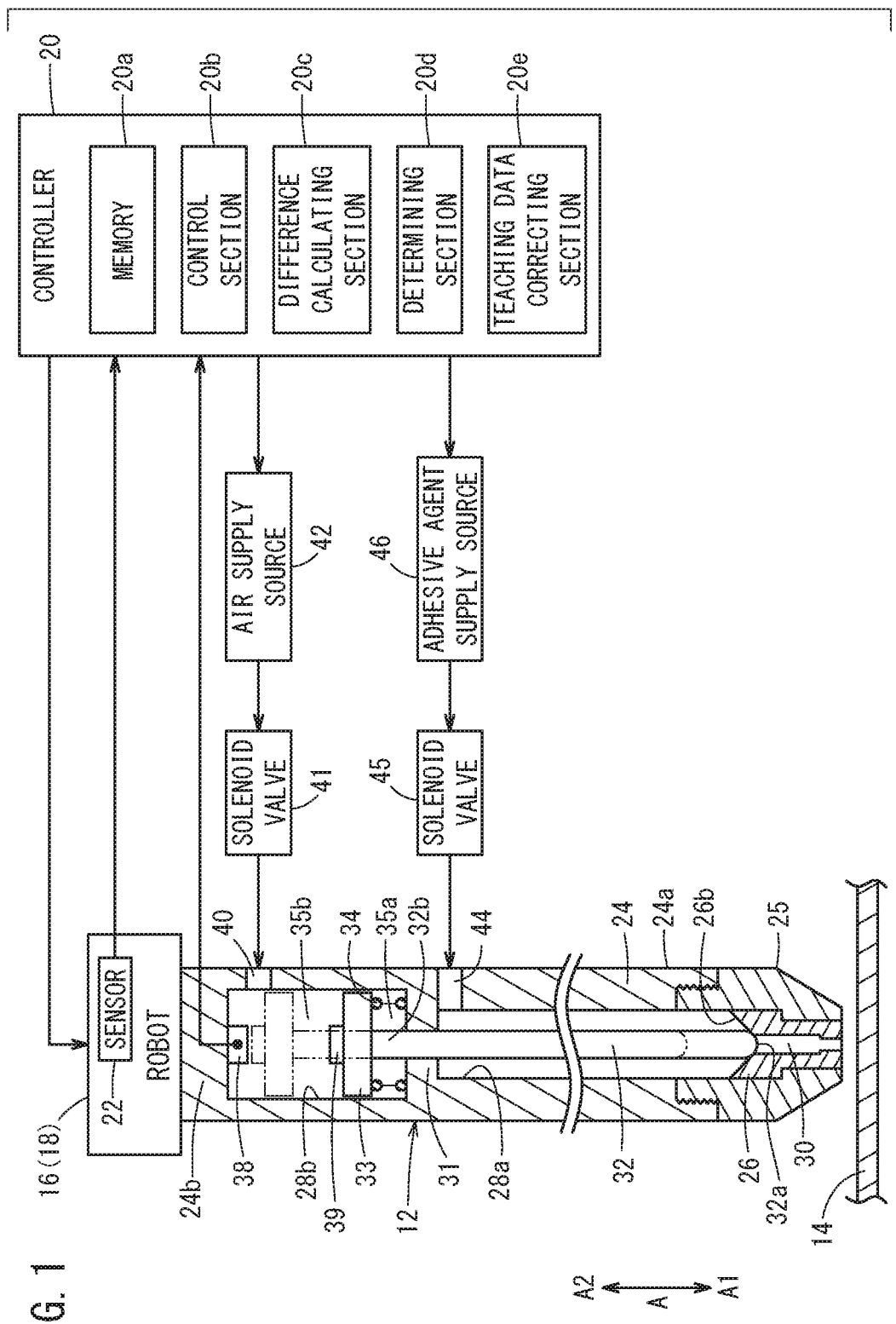
FIG. 1 is a configuration diagram of a nozzle distance confirming device according to the present embodiment.

A preferred embodiment of a nozzle distance confirming device and a method of nozzle distance confirmation according to the present invention will be exemplified and described in detail below with reference to the accompanying drawings.

1. Configuration of Present Embodiment

A nozzle distance confirming device 10 according to the present embodiment is a device used for confirming a distance between a nozzle 12 and a workpiece 14. The nozzle 12 and the workpiece 14 will be described here prior to description of the nozzle distance confirming device 10.
<1.1 Outline of Nozzle 12 and Workpiece 14>

The nozzle 12 is mounted on a tip of an arm 18 of a robot 16 (a moving unit). The robot 16 operates according to an instruction from a controller 20. Hence, by the arm 18 of the robot 16 operating, a relative position of the nozzle 12 with respect to the workpiece 14, that is, the distance between the nozzle 12 and the workpiece 14, changes. The robot 16 has installed therein a sensor 22 (a movement position detecting unit) that detects a position of the arm 18. Note that any kind of detection system of sensor may be adopted as the sensor 22, provided it can detect the position of the arm 18.

The nozzle 12 includes a nozzle main body 24 of bottomed cylindrical shape whose inside is a cavity. The nozzle main body 24 extends in an A direction (an axial direction). A tip section 24*a* on an A1 direction side of the nozzle main body 24 opens to outside, and has a screw hole formed therein. The screw hole of the tip section 24*a* has an exchange section 25 screwed into it in an attachable and detachable manner. The exchange section 25 is a cylindrical member that communicates with a first cavity section 28*a* being an inside portion of the nozzle main body 24. A nozzle tip member 26 is mounted inside the exchange section 25. Hence, the nozzle tip member 26 is mounted in an attachable and detachable manner in the nozzle main body 24, via the exchange section 25.

An opening section 30 as a through-hole that enables communication between the first cavity section 28*a* and outside, is formed in the A direction in the nozzle tip member 26. The opening section 30 is a stepped orifice of smaller diameter than the inside portions of the first cavity section 28*a* of the nozzle main body 24 and the exchange section 25, facing in an A1 direction. The nozzle tip member 26 is mounted in the exchange section 25 in such a manner that the opening section 30 will be substantially coaxial with the nozzle main body 24 and the exchange section 25.

Note that a tip portion on the A1 direction side of the exchange section 25 and a tip portion on the A1 direction side of the nozzle tip member 26 are formed substantially flush with each other. Hence, the tip portion of the exchange section 25 and tip portion of the nozzle tip member 26, or the tip portion of the exchange section 25 form a tip of the nozzle 12.

A base end section 24*b* on an A2 direction side of the nozzle main body 24 is mounted on the tip of the arm 18 of the robot 16. A second cavity section 28*b* is formed on a base end section 24*b* side of the nozzle main body 24.

A needle 32 extending in the A direction is arranged in the first cavity section 28*a*. A tip section 32*a* in the A1 direction of the needle 32 is able to abut on a seat section 26*b* on the A2 direction side of the nozzle tip member 26 and thereby block the opening section 30.

A base end section 32*b* in an A2 direction of the needle 32 penetrates a partition wall 31 between the first cavity section 28*a* and the second cavity section 28*b* to face into the second cavity section 28*b*. A piston 33 is coupled to the base end section 32*b* of the needle 32. The piston 33 is configured including a magnetic body, and partitions the second cavity section 28*b* into a first chamber 35*a* on the A1 direction side and a second chamber 35*b* on the A2 direction side. Hence, the needle 32 functions as a piston rod of the piston 33.

A spring member 34 having an elastic force in the A2 direction is inserted in an intervening manner between the partition wall 31 and the piston 33, in the first chamber 35*a* on the A1 direction side of the second cavity section 28*b*. Moreover, an eddy current sensor 38 (a needle position detecting unit) that detects a position of the needle 32 (the piston 33) is arranged in a place on a base end section 24*b* side of the second chamber 35*b*. Furthermore, a stopper 39 that, when the piston 33 has been displaced to a vicinity of the eddy current sensor 38 along the A2 direction, contacts the eddy current sensor 38 to obstruct movement in the A2 direction of the piston 33, is provided on the A2 direction side of the piston 33.

Note that a detecting method of the eddy current sensor 38 is publicly known, hence a detailed description thereof will be omitted. Moreover, in the present embodiment, all that is required is that the position of the needle 32 can be detected, hence the position of the needle 32 may be detected by a position detecting unit other than the eddy current sensor 38, for example, a position detecting unit that uses ultrasonic waves or a laser.

An air supply hole 40 communicating with the second chamber 35*b* is formed on the base end section 24*b* side of the nozzle main body 24. An air supply source 42 is coupled to the air supply hole 40 via a 3-ported solenoid valve 41, for example. An adhesive agent supply hole 44 communicating with the first cavity section 28*a* is formed more to the A1 direction side than the air supply hole 40 is, in the nozzle main body 24. An adhesive agent supply source 46 is coupled to the adhesive agent supply hole 44 via a 2-ported solenoid valve 45, for example.

Now, when the controller 20 drives the air supply source 42 and is controlling the solenoid valve 41 to a supply state of compressed air, compressed air is supplied to the second chamber 35*b* via the solenoid valve 41 and the air supply hole 40 from the air supply source 42. Thus, the piston 33 is displaced in the A1 direction against the elastic force of the spring member 34. As a result, the tip section 32*a* of the needle 32 abuts on the seat section 26*b* of the nozzle tip member 26, and blocks the opening section 30 (refer to FIGS. 1 and 2A).

On the other hand, when the controller 20 stops drive of the air supply source 42 and is controlling the solenoid valve 41 to a discharge state of compressed air, supply of compressed air to the second chamber 35*b* from the air supply source 42 stops, while compressed air in the second chamber 35*b* is discharged to outside via the solenoid valve 41. Thus, the piston 33 is displaced in the A2 direction by the elastic force of the spring member 34. As a result, the tip section 32*a* of the needle 32 separates from the seat section 26*b* as shown by the two dot-chain line in FIG. 1, and the opening section 30 opens as in FIG. 1.

When, in this state, the controller 20 drives the adhesive agent supply source 46 and controls the solenoid valve 45 to a valve-opened state, an adhesive agent can be supplied to the first cavity section 28*a* via the solenoid valve 45 and the adhesive agent supply hole 44 from the adhesive agent supply source 46. The adhesive agent supplied to the first cavity section 28*a* moves in the A1 direction, and is jetted to outside via the opening section 30 from the first cavity section 28*a*.

Note that when the controller 20 stops drive of the adhesive agent supply source 46 and controls the solenoid valve 45 to a valve-closed state, supply of the adhesive agent to the first cavity section 28*a* from the adhesive agent supply source 46 stops. As a result, jetting of the adhesive agent to outside from the opening section 30 stops.

The workpiece 14 is part of a vehicle body frame configuring a vehicle, for example. In a state where the opening section 30 faces a surface of the workpiece 14 being an object-to-be-adhered-to, the nozzle 12 jets the adhesive agent from the opening section 30 and thereby applies the adhesive agent to the workpiece 14.

<1.2 Configuration of Nozzle Distance Confirming Device 10>

Moreover, the nozzle distance confirming device 10 according to the present embodiment is applied to confirm the distance of the nozzle 12 from the workpiece 14, more specifically, a distance between the nozzle tip member 26 configuring the tip of the nozzle 12 and the surface of the workpiece 14, when applying the adhesive agent to the workpiece 14 from the nozzle 12.

Figure 2A:
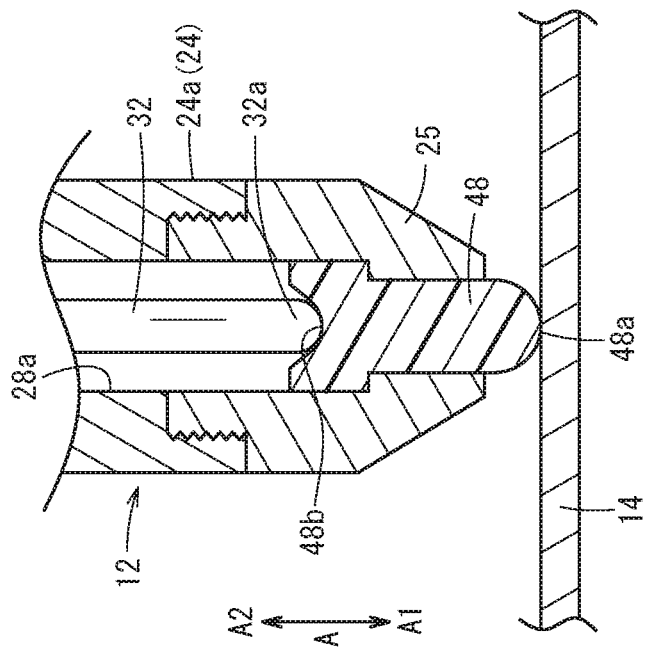
FIG. 2A is a partial cross-sectional view showing a state where a nozzle tip member has been mounted in an exchange section.
Figure 2B:
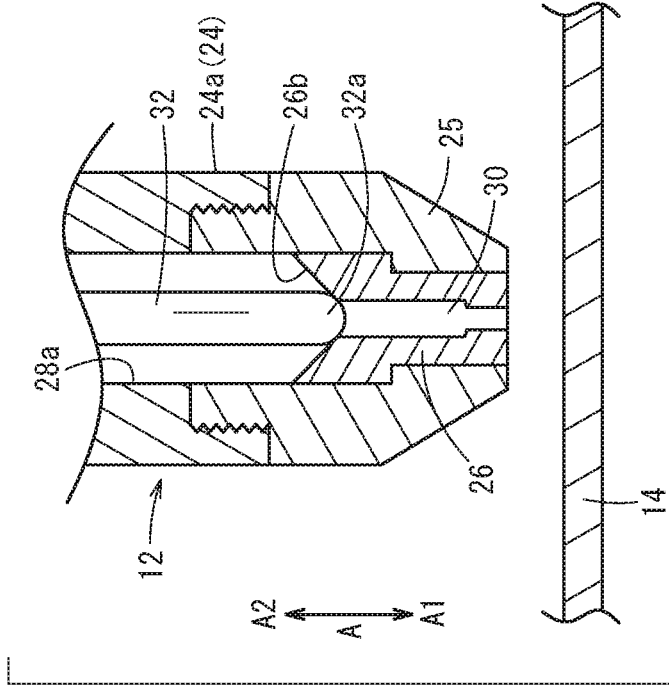
FIG. 2B is a partial cross-sectional view showing a state where a nozzle distance confirming member has been mounted in the exchange section.

As shown in FIGS. 1-2B, the nozzle distance confirming device 10 further includes a nozzle distance confirming member 48, in addition to the previously mentioned controller 20, sensor 22, nozzle tip member 26, needle 32, piston 33, spring member 34, eddy current sensor 38, solenoid valve 41, and air supply source 42. The controller 20 executes a program stored in a memory 20a to implement functions of a control section 20b, a difference calculating section 20c, a determining section 20d, and a teaching data correcting section 20e.

The nozzle distance confirming member 48 is a member made of a resin. When confirming the distance between the nozzle 12 and the workpiece 14, the nozzle distance confirming member 48 is mounted in the exchange section 25 in place of the nozzle tip member 26 in a state where the nozzle tip member 26 together with the exchange section 25 has been removed from the tip section 24a of the nozzle main body 24. Then, the exchange section 25 mounted with the nozzle distance confirming member 48 is screwed into the screw hole of the tip section 24a of the nozzle main body 24, whereby the nozzle distance confirming member 48 is attached to the nozzle 12. Hence, the nozzle distance confirming member 48 is attachable to the tip (the exchange section 25) of the nozzle 12.

The nozzle distance confirming member 48 has a substantially similar shape of external appearance to the nozzle tip member 26. However, the nozzle distance confirming member 48 does not have the opening section 30 formed therein. Hence, when the nozzle distance confirming member 48 is mounted in the exchange section 25, the tip section 24a of the nozzle main body 24 and the exchange section 25 are blocked. Moreover, the A2 direction side of the nozzle distance confirming member 48 is configured as a seat section 48b on which the tip section 32a of the needle 32 can abut. Note that in a state where the nozzle distance confirming member 48 has been mounted in the exchange section 25, a height position of the seat section 48b is set to substantially the same height position as the seat section 26b of the nozzle tip member 26 (refer to FIGS. 2A and 2B).

A tip section 48a in the A1 direction of the nozzle distance confirming member 48 projects with a circular arc-shaped cross section in the A1 direction from the exchange section 25, and can contact the surface of the workpiece 14. Hence, when confirming the distance between the tip of the nozzle 12 and the surface of the workpiece 14, the tip section 48a of the nozzle distance confirming member 48 is brought into contact with the surface of the workpiece 14 in a state where the tip section 32a of the needle 32 abuts on the nozzle distance confirming member 48, and the tip section 48a has been exposed from the exchange section 25. In this case, compressed air having a pressure of a degree that the nozzle distance confirming member 48 is lightly pressed to an exchange section 25 side by the needle 32, is supplied to the second chamber 35b via the solenoid valve 41 and the air supply hole 40 from the air supply source 42.

Note that sometimes, when the tip section 48a of the nozzle distance confirming member 48 contacts the surface of the workpiece 14, the nozzle distance confirming member 48 is displaced in the A2 direction by a force received from the surface of the workpiece 14. As a result, the needle 32 seated on the seat section 48b of the nozzle distance confirming member 48 and the piston 33 are thereby displaced in the A2 direction against a pressing force due to compressed air. The eddy current sensor 38 detects such a displacement of the needle 32 and piston 33.

The control section 20b performs control of the robot 16, control of the solenoid valve 41 and air supply source 42, and control of the solenoid valve 45 and adhesive agent supply source 46.

In addition to the previously mentioned program being stored in the memory 20a, teaching data that indicates the position of the tip of the nozzle 12 (the exchange section 25 and nozzle tip member 26) with respect to the surface of the workpiece 14 during actual work of the nozzle 12 (during application of the adhesive agent to the workpiece 14 from the nozzle 12) is stored in the memory 20a. Hence, during actual work, in a state where the nozzle tip member 26 has been mounted in the exchange section 25, the control section 20b controls the robot 16 according to the teaching data, and thereby controls a position of the exchange section 25 and nozzle tip member 26 with respect to the workpiece 14 so as to be the position indicated in the teaching data, and executes application of the adhesive agent to the workpiece 14 from the nozzle 12.

When confirming the distance between the nozzle 12 and the workpiece 14, the difference calculating section 20c calculates from a position of the arm 18 of the robot 16 detected by the sensor 22 and a position of the needle 32 detected by the eddy current sensor 38, a position of the nozzle distance confirming member 48. More specifically, a position of the exchange section 25 and nozzle tip member 26 corresponding to the position of the nozzle distance confirming member 48 (hereafter, also called as an actual measurement position) is calculated. Moreover, the difference calculating section 20c calculates a difference between the calculated actual measurement position and the position of the exchange section 25 and nozzle tip member 26 indicated by the teaching data.

The determining section 20d determines whether or not the position of the needle 32 detected by the eddy current sensor 38 exceeds a certain threshold.

In the case that the position of the needle 32 exceeds the threshold, and the determining section 20d has determined correction of the teaching data to be required, the teaching data correcting section 20e uses the difference calculated by the difference calculating section 20c to correct the position of the exchange section 25 and nozzle tip member 26 indicated by the teaching data. Hence, the teaching data correcting section 20e updates the teaching data with a corrected position.

2. Operation of Present Embodiment

Next, operation of the nozzle distance confirming device 10 (the method of nozzle distance confirmation) according to the present embodiment will be described with reference to FIGS. 3 and 4. Note that in this description of operation, description will be made referring to FIGS. 1-2B as required.

FIG. 3 is a timing chart showing a time course of position (height position) of the needle 32 detected by the eddy current sensor 38. FIG. 3 illustrates: a result during actual work of applying the adhesive agent to the workpiece 14 from the nozzle 12 (a result during normal application); and a result when mounting the nozzle distance confirming member 48 in the exchange section 25 to bring the tip section 48a of the nozzle distance confirming member 48 into contact with the surface of the workpiece 14 and confirm the distance between the nozzle 12 and the workpiece 14 (a result during nozzle distance confirmation).

During normal application, in a state where compressed air is being supplied to the second chamber 35b, the tip section 32a of the needle 32 is seated on the seat section 26b of the nozzle tip member 26 so that a blocked state of the opening section 30 is achieved. Therefore, the height position of the needle 32 (the detection result of the eddy current sensor 38) will be a substantially zero level position indicated by the one dot-chain line. On the other hand, during normal application, in a state where compressed air is being discharged from the second chamber 35b, the needle 32 is displaced in the A2 direction. Therefore, the height position of the needle 32 will be in a state of having risen up from the substantially zero level, as indicated by the solid line. Hence, when supply and discharge of compressed air to/from the second chamber 35b is repeated, the eddy current sensor 38 outputs to the controller 20 a detection signal repeating the substantially zero level and a certain signal level, as shown in the timing chart on an upper side of FIG. 3.

In contrast, during nozzle distance confirmation, in a state where the nozzle tip member 26 has been changed with the nozzle distance confirming member 48, compressed air is supplied to the second chamber 35b, and the tip section 32a of the needle 32 lightly abuts on the seat section 48b of the nozzle distance confirming member 48. Thus, the nozzle distance confirming member 48 is lightly pressed in the A1 direction. As a result, the tip section 48a of the nozzle distance confirming member 48 is exposed to outside to contact the surface of the workpiece 14. Hence, during nozzle distance confirmation, when the tip section 32a of the needle 32 is abutting on the seat section 48b of the nozzle distance confirming member 48, the eddy current sensor 38 outputs a substantially zero level detection signal.

On the other hand, if, as shown by the solid line in the timing chart on a lower side of FIG. 3, the needle 32 is for some reason displaced to the A2 direction side, and a signal level of the detection signal exceeds the threshold indicated by the two-dot chain line, then it can be determined that some kind of abnormality (NG) has occurred in the distance between the nozzle 12 and the workpiece 14. For example, sometimes, when the nozzle distance confirming member 48 contacts the surface of the workpiece 14 due to the nozzle 12 being moved and the exchange section 25 coming close to the surface of the workpiece 14 in accordance with the teaching data, the nozzle distance confirming member 48 and the needle 32 are displaced in the A2 direction by a force from the surface of the workpiece 14.

FIG. 4 is a flowchart for executing a determining method of FIG. 3.

In step S1, the exchange section 25 is removed from the tip section 24a of the nozzle main body 24, and the nozzle tip member 26 mounted in the exchange section 25 is removed. Next, the nozzle distance confirming member 48 is mounted in the exchange section 25, and the exchange section 25 is screwed into the screw hole of the tip section 24a of the nozzle main body 24. As a result, the nozzle distance confirming member 48 is attached to the nozzle main body 24 via the exchange section 25.

In step S2, the solenoid valve 41 is switched to the supply state of compressed air, and supply of compressed air is started from the air supply source 42. Thus, compressed air is supplied to the second chamber 35b, and the needle 32 and piston 33 are displaced in the A1 direction against the elastic force of the spring member 34. As a result, the tip section 32a of the needle 32 abuts on the seat section 48b of the nozzle distance confirming member 48, and the tip section 48a of the nozzle distance confirming member 48 is exposed from the exchange section 25.

In step S3, the control section 20b of the controller 20 controls the robot 16 according to the teaching data stored in the memory 20a. As a result, the arm 18 of the robot 16 moves, the exchange section 25 faces the surface of the workpiece 14, and the tip section 48a of the nozzle distance confirming member 48 contacts the surface of the workpiece 14. In this state, the sensor 22 detects the position of the arm 18 of the robot 16, and outputs that detection result to the controller 20. Moreover, the eddy current sensor 38 detects the position of the needle 32, and outputs that detection result to the controller 20.

In step S4, the difference calculating section 20c calculates the position (the actual measurement position) of the exchange section 25 corresponding to the position of the nozzle distance confirming member 48 using the detection result of the sensor 22 (the position of the arm 18) and the detection result of the eddy current sensor 38 (the position of the needle 32), and calculates the difference between the calculated actual measurement position and the position of the exchange section 25 and nozzle tip member 26 indicated by the teaching data.

In step S5, the determining section 20d determines whether or not the position of the needle 32 detected by the eddy current sensor 38 is exceeding the threshold. If the position of the needle 32 is exceeding the threshold, then the determining section 20d determines correction of the teaching data to be required (step S5: YES), and proceeds to next step S6.

In step S6, the teaching data correcting section 20e receives the affirmative determination result of the determining section 20d, and uses the difference calculated by the difference calculating section 20c to correct the position of the exchange section 25 and nozzle tip member 26 indicated by the teaching data. Then, in step S7, the teaching data correcting section 20e updates the teaching data stored in the memory 20a with the corrected position.

On the other hand, in step S5, if the position of the needle 32 detected by the eddy current sensor 38 is not exceeding the threshold (step S5: NO), then the determining section 20d determines correction of the teaching data to be unnecessary, and skips steps S6 and S7. Alternatively, it is possible that only step S6 is skipped, and that, in step S7, the teaching data correcting section 20e creates teaching data based on a processing result this time, and stores the created teaching data in the memory 20a.

In step S8, the determining section 20d determines whether or not confirmation work of the distance between the nozzle 12 and the workpiece 14 should be ended. If confirmation work has not been completed (step S8: NO), then processing returns to step S2 or S3, and processing of steps S2-S7 or steps S3-S7 is executed again.

On the other hand, if confirmation work is to be ended (step S8: YES), then processing proceeds to step S9, drive of the air supply source 42 is stopped, and the solenoid valve 41 is set to the discharge state of compressed air. Next, the nozzle distance confirming member 48 together with the exchange section 25 is removed from the tip section 24a of the nozzle main body 24, and the nozzle tip member 26 is mounted in the exchange section 25 in place of the nozzle distance confirming member 48. Then, the exchange section 25 is screwed into the screw hole of the tip section 24a of the nozzle main body 24, and the nozzle tip member 26 is attached to the nozzle main body 24. This enables application of the adhesive agent to the workpiece 14 from the nozzle 12 using the (updated) teaching data stored in the memory 20a.

3. Advantages of Present Embodiment

As described above, the nozzle distance confirming device 10 according to the present embodiment includes: the needle 32 configured to open and close the opening section 30 of the tip of the nozzle 12 (the exchange section 25); the needle advancing and retracting unit (the piston 33, the spring member 34, the solenoid valve 41, and the air supply source 42) configured to advance and retract the needle 32 with respect to the opening section 30; the eddy current sensor 38 (the needle position detecting unit) configured to detect the position of the needle 32; and the nozzle distance confirming member 48 provided in an attachable manner to the tip of the nozzle 12, configured to abut on the tip section 32a of the needle 32, and configured to, when confirming the distance between the nozzle 12 and the workpiece 14, contact the workpiece 14 by being exposed from the tip of the nozzle 12 in a state of having abutted on the tip section 32a of the needle 32.

Moreover, the method of nozzle distance confirmation according to the present embodiment includes the steps of: attaching the nozzle distance confirming member 48 to the tip of the nozzle 12 (step S1); causing the tip section 32a of the needle 32 to abut on the nozzle distance confirming member 48, and thereby exposing the nozzle distance confirming member 48 from the tip of the nozzle 12 to bring the nozzle distance confirming member 48 into contact with the workpiece 14 (step S2); and detecting the position of the needle 32 by the eddy current sensor 38 (step S3).

As a result, when confirming the distance between the nozzle 12 and the workpiece 14, the needle 32 is advanced and retracted according to the teaching data, and the tip section 32a of the needle 32 abuts on the nozzle distance confirming member 48, whereby the position of the needle 32 when the nozzle distance confirming member 48 has contacted the workpiece 14 can be detected. In this case, if there is a difference between the position of the needle 32 expected from the teaching data and the position of the needle 32 actually detected, then it can be grasped in advance that there is an error between the position of the nozzle 12 indicated by the teaching data and the actual position of the nozzle 12 with respect to the workpiece 14 (the actual measurement position). Hence, in the present embodiment, an error of the teaching data can be easily and efficiently confirmed.

Moreover, in the present embodiment, all except for the nozzle distance confirming member 48 are configuring elements required in application of the adhesive agent. Hence, the distance between the nozzle 12 and the workpiece 14 can be confirmed by an extremely simple and cheap configuration.

In addition, the nozzle distance confirming device 10 further includes: the sensor 22 (the movement position detecting unit) configured to detect the position of the arm 18 of the robot 16 (the moving unit) on which the nozzle 12 is mounted; the difference calculating section 20c configured to, when confirming the distance between the nozzle 12 and the workpiece 14, calculate the position of the nozzle distance confirming member 48 from each of the detection results of the sensor 22 and the eddy current sensor 38, and calculate the difference between the calculated position of the nozzle distance confirming member 48, and teaching data indicating the position of the tip of the nozzle 12 with respect to the workpiece 14 during actual work of the nozzle 12; and the teaching data correcting section 20e configured to use the calculated difference to correct the teaching data. As a result, an error of the teaching data can be accurately calculated, and the calculated error can be appropriately corrected.

Moreover, the nozzle distance confirming device 10 further includes the determining section 20d configured to, when confirming the distance between the nozzle 12 and the workpiece 14, determine that correction of the teaching data is required in the case where the position of the needle 32 detected by the eddy current sensor 38 exceeds the threshold. As a result, necessity of correction of the teaching data can be certainly determined.

Moreover, the nozzle distance confirming device 10 further includes the nozzle tip member 26 provided in an attachable manner to the tip of the nozzle 12, and including the opening section 30. In this case, when confirming the distance between the nozzle 12 and the workpiece 14, the nozzle tip member 26 is removed to have the nozzle distance confirming member 48 attached, and the tip section 32a of the needle 32 is caused to abut on the nozzle distance confirming member 48, thereby bringing the nozzle distance confirming member 48 into contact with the workpiece 14. As a result, confirmation work of the distance between the nozzle 12 and the workpiece 14 can be performed even more easily and at even lower cost.

In this case, provided the nozzle distance confirming member 48 is made of a resin, confirmation work of the distance between the nozzle 12 and the workpiece 14 can be performed without damaging the surface of the workpiece 14.

Note that the present invention is not limited to the above-mentioned embodiment, and that, of course, a variety of configurations may be adopted based on the described content of this specification.

What is claimed is:

1. A nozzle distance confirming device for confirming a distance between a nozzle and a workpiece, comprising:
   a needle configured to open and close an opening section of a tip of the nozzle;
   a needle advancing and retracting unit configured to advance and retract the needle with respect to the opening section;
   a needle position detecting unit configured to detect a position of the needle; and
   a nozzle distance confirming member provided in an attachable manner to the tip of the nozzle, configured to abut on a tip of the needle, and configured to, when confirming the distance between the nozzle and the workpiece, contact the workpiece by being exposed from the tip of the nozzle in a state of having abutted on the tip of the needle.

2. The nozzle distance confirming device according to claim 1, further comprising:
   a movement position detecting unit configured to detect a position of a moving unit on which the nozzle is mounted;
   a difference calculating section configured to, when confirming the distance between the nozzle and the workpiece, calculate a position of the nozzle distance confirming member from each of detection results of the movement position detecting unit and the needle position detecting unit, and calculate a difference between the calculated position of the nozzle distance confirming member, and teaching data indicating a position of the tip of the nozzle with respect to the workpiece during actual work of the nozzle; and
   a teaching data correcting section configured to use the calculated difference to correct the teaching data.

3. The nozzle distance confirming device according to claim 2, further comprising a determining section configured to, when confirming the distance between the nozzle and the workpiece, determine that correction of the teaching data is required in a case where the position of the needle detected by the needle position detecting unit exceeds a threshold.

4. The nozzle distance confirming device according to claim 1, further comprising a nozzle tip member provided in an attachable manner to the tip of the nozzle, and including an opening section, wherein, when confirming the distance between the nozzle and the workpiece, the nozzle tip member is removed to have the nozzle distance confirming member attached, and the tip of the needle is caused to abut on the nozzle distance confirming member, thereby bringing the nozzle distance confirming member into contact with the workpiece.

5. The nozzle distance confirming device according to claim 1, wherein the nozzle distance confirming member is made of a resin.

6. A method of nozzle distance confirmation for confirming a distance between a nozzle and a workpiece, comprising the steps of:

attaching a nozzle distance confirming member to a tip of the nozzle;

causing a tip of a needle to abut on the nozzle distance confirming member by a needle advancing and retracting unit, and thereby exposing the nozzle distance confirming member from the tip of the nozzle to bring the nozzle distance confirming member into contact with the workpiece; and detecting a position of the needle by a needle position detecting unit.

* * * * *